United States Patent Office 2,915,519
Patented Dec. 1, 1959

2,915,519

PROCESSING CELLULOSE NITRATE

William D. Stewart, Falls Church, Va., and Edward Pondexter, Jr., and William L. Wachtel, Washington, D.C., assignors to Atlantic Research Corporation, Alexandria, Va., a corporation of Virginia No Drawing. Application September 28, 1954
Serial No. 458,992

17 Claims. (Cl. 260—223)

This invention relates to a new and improved process for preparing cellulose nitrate in the form of small, spherical particles of high density.

Methods for making spherical particles of cellulose nitrate having the desired characteristics are described in the co-pending applications of Arthur W. Sloan and David J. Mann, Serial Numbers 449,776 and 449,777, filed August 13, 1954. The process described herein possesses the advantages, as compared with the Sloan and Mann processes, of greater simplicity, reduced cost and the elimination of the numerous washings of the particles required to remove the coating of protective colloid.

The object of this invention is to provide a process for making small, dense, spherical particles of cellulose nitrate which requires the addition of a minimum of readily removable treating agent.

Other objects and advantages will become obvious from the following detailed description.

Broadly, the invention comprises dissolving cellulose nitrate in a suitable solvent to form a lacquer, dispersing the lacquer in an aqueous vehicle in the presence of a suitable emulsifying agent under vigorous agitation, removing the solvent from the dispersed cellulose nitrate particles while suspended in the water, washing and drying the particles.

The process may be applied to cellulose nitrate of both low and high nitrogen content as, for example, nitrocellulose containing from 9 to 13.5% nitrogen.

The cellulose nitrate solvent may be a single solvent which is moderately soluble in water, a mixture of solvents, the components of which are moderately soluble in water, or a mixture of solvents, at least one component of which is moderately soluble in water and another component of which is infinitely soluble in water. By "moderately" soluble is meant a solvent which is soluble in water at least to the extent of 5 parts per 100 parts of water at 20° C. but is not infinitely soluble. By "infinitely" soluble is meant a solvent which is soluble in water in all proportions. Maximum solubility in water of the cellulose nitrate solvent should be about 80 parts per 100 parts of water and preferably about 40 to 60 parts. Thus, if a mixed solvent is employed with an infinitely soluble component, the amount of infinitely soluble component must be adjusted to maintain total solubility in water of the mixed solvent within the desired range.

Examples of moderately water-soluble organic solvents include methyl acetate, ethyl acetate, methyl formate, ethyl formate, methyl ethyl ketone, diethyl ether and nitromethane. The moderately water-soluble solvents preferably range in water-solubility from about 5 to 30 parts per 100 parts of water at 20° C.

Infinitely water-soluble co-solvents include the lower aliphatic alcohols such as methyl, ethyl and propyl alcohols, acetone, methyl lactate, ethyl lactate, and dioxan–1,4. Where co-solvent mixtures are used, it is not essential that each of the solvent components be a good solvent for the cellulose nitrate so long as they possess good solvent properties when in admixture. Diethyl ether and the lower aliphatic alcohols, for example, though poor solvents for cellulose nitrate per se, possess excellent co-solvent properties. It is desirable that the infinitely soluble component of a mixed cellulose nitrate solvent possess the ability to reduce viscosity of the lacquer. Methanol, ethanol and acetone are particularly effective in this regard.

We have found that particles having the desired characteristics cannot be obtained with a cellulose nitrate solvent which is substantially insoluble in water, namely soluble in water to the extent of less than about 5 parts per 100, or which is excessively soluble. The water solubility must be sufficient so that when the lacquer particles are dispersed in water, the solvent at and adjacent to the surface dissolves with sufficient rapidity in the water to permit some hardening or setting of the particle surface and thus eliminates or markedly reduces the surface tackiness to the point where such surface tackiness will not cause agglomeration. On the other hand, elution of the solvent should not be so rapid that the surface sets into a hard, non-plastic condition before surface tension forces can effectively shape the particles into the desired spherical form. Premature excessive hardening of the particle surface also causes porosity since the non-plastic surface does not permit adequate shrinkage to compensate for removal of solvent from the interior of the particle. With a cellulose nitrate solvent of excessive water-solubility, porosity may also be caused by migration of water into the particle because of the mutual solubility of water and a highly water-soluble solvent. As aforementioned, the water-solubility of the cellulose nitrate solvent, whether single or mixed, should be within a range of about 5 to 80 parts per 100 parts of water at 20° C. and preferably about 5 to 40 or 60.

The concentration of cellulose nitrate dissolved in the lacquer is determined to some extent by the degree of nitration and the particular solvent employed. Cellulose nitrate of high nitrogen content as, for example, about 12 to 13.5%, tend to form lacquers of relatively high viscosity and, in general, maximum concentration for optimum performance is about 10% and preferably about 7.5% In the case of lower viscosity cellulose nitrate as, for example, cellulose nitrate having a nitrogen content up to about 12%, concentration in the lacquer may be as high as 15% to 20%. There is no critical lower limit of cellulose nitrate concentration in the lacquer other than that dictated by economic expediency. Good results are obtainable, for example, with concentrations as low as 2%. This, however, requires the use of large amounts of solvent and large operating equipment relative to the amount of cellulose nitrate processed.

As aforementioned, choice of the particular solvent also influences to some degree, the cellulose nitrate concentration in the lacquer. Viscosity of the lacquer varies with different solvents and the concentration of cellulose nitrate may be varied accordingly.

Solvent systems which we have found to be particularly satisfactory include methyl ethyl ketone/acetone, ethyl acetate, ethyl acetate/ethanol, ethyl acetate/acetone and nitromethane. These form lacquers with cellulose nitrate of high nitrogen content (over 12%) which are not excessively viscous and also perform well with cellulose nitrate of lower nitrogen content. The methyl ethyl ketone/acetone system is especially good for use with low nitrogen cellulose nitrate.

Where a mixed cellulose nitrate solvent, as, for example, one containing an infinitely soluble component, is employed, the ratio of components for optimum performance can readily be determined by routine experimentation. In most cases, a ratio of moderately soluble component to infinitely soluble component of about 85:15 is particularly good. However, this may be varied so long as total solubility of the mixed solvent does not become excessive. For example, the ratio of acetone to methyl ethyl ketone may be increased to equal parts without significant increase in particle size. With further increase of acetone the particles become larger and at a ratio of 3:1, particle size ranges up to 50 microns. At ratios of 4:1, the solvent is removed too rapidly to permit sphere formation before hardening occurs.

The cellulose nitrate lacquer is mixed with water in the presence of a suitable emulsifying agent under continuous, vigorous agitation to form a dispersion of small lacquer particles with the water as the continuous phase. The emulsifying agent may be introduced into the lacquer or into the water prior to mixing or may be added to the lacquer-water mix. The dispersion and agitation may be accomplished by any suitable means as, for example, in a homogenizer or other suitable agitating device. The degree of agitation is one of the factors influencing particle size. In general, the more vigorous the agitation, the smaller are the particles.

The emulsifying agent is essential since it makes possible the fine comminution of the suspended particles and stabilizes the emulsion so that the surface of the particles have an opportunity to harden into a substantially nontacky condition before agglomeration can occur. The emulsifying agent must be of the polar type which does not increase the viscosity of the water phase to any substantial degree and which functions primarily as a surface tension depressant as compared with the high molecular weight materials which function primarily as protective colloids. The emulsifying agent, furthermore, should be substantially water-soluble or, in other words, should possess a sufficiently high hydrophile-lipophile balance to prevent its being drawn into the organic solvent and converting the emulsion into a water-in-oil type system.

Examples of suitable polar-type emulsifiers or dispersing agents include alkyl sulfates or sulfonates, alkyl aryl sulfonates, alkali metal soaps, alkali metal and ammonium salts of perfluoro acids, alkali metal salts of sulfosuccinic acids, polyglycols such as polyethylene glycol, sulfonated vegetable oils such as sulfonated castor oil and sulfonated coconut oil, sulfonated hydrocarbon oils such as sulfonated petroleum fractions, and the like. The sulfonated oils such as Turkey red oil and sulfonated petroleum oils are particularly satisfactory either alone or combined with other surface-active agents such as the highly active wetting agents. However, any compatible surface active emulsifying agent may be employed to give satisfactory results.

The amount of emulsifier varies to some extent with the activity of the specific one used and with the particular solvent used in making the cellulose nitrate lacquer. The amount used should be sufficient to permit rapid comminution of the particles and the formation of the emulsion before excessive surface hardening of the particles into irregular shapes. Amounts comprising about 0.01 to 0.2% based on the water phase are generally adequate although this may vary, as aforementioned, depending upon specific circumstances. There is no critical upper limit with regard to the amount of emulsifying agent other than the fact that, in general, no advantage is obtained with amounts exceeding about 5 to 10% on the aqueous phase to warrant the increased cost.

Particle size is a function of the lacquer/water ratio in as much as increasing the amount of water results in an increase in particle size. Thus the quantity of water used in emulsification is determined in some measure by the particle size desired. The minimum amount of water is governed by the lacquer/water ratio required to permit formation of the requisite oil-in-water system rather than a water-in-oil type emulsion. If excessive water is employed, the particles tend to be oversize, irregular and porous, apparently because the organic solvent dissolves in the water phase with excessive rapidity so that the surface of the particles hardens into a non-plastic condition before adequate comminution or contraction into spheres. The optimum amount of water varies with the particular organic solvents used. In general, amounts ranging from about 50 to 100% by volume, and preferably about 50 to 75%, based on the volume of organic solvent, gives highly satisfactory results.

After emulsification of the lacquer is completed, the organic solvent must be removed from the dispersed lacquer particles. This may be accomplished by either of two methods. The solvent may be distilled off or eluted by dilution of the emulsion with additional water. During either process the dispersion should be maintained in a state of vigorous agitation.

Where distillation is employed the temperature of the emulsion generally rises up to the boiling point of the volatile lacquer solvent or its water azeotrope and remains at this temperature until a substantial portion of the solvent has vaporized. We have found that the temperature should desirably be maintained well below the boiling point of water, desirably at a maximum temperature of about 65° C., since higher temperatures tend to break the emulsion, thus causing agglomeration and consequent particle irregularity and oversize. Excessively high temperatures also cause removal of solvent from the surface of the particles at such a rapid rate that the surface sets and hardens to such an extent that surface plasticity is insufficient to compensate by contraction for removal of interior solvent and thus results in a porous particle. For optimum performance the temperature preferably should not exceed about 40 to 50° C. Thus, in many instances, it is advisable to distill under vacuum, in which case the temperature of the emulsion during substantial solvent removal is up to the boiling point of the lacquer solvent or its water azeotrope as illustrated in Examples II and III.

An alternative method for removing the organic solvent comprises dissolving it out by dilution of the emulsion with added water. The amount of water added to the emulsion for elution purposes should be in sufficient amount to permit aqueous solution of substantially all of the organic solvent contained in the cellulose nitrate particles. This to a considerable degree is determined by the solvent-water ratio in the original emulsion and the water-solubility of the specific organic solvent. The amount of water added is also a factor in the length of time required for elution. The larger the amount of water added, the shorter is the time required to remove the solvent.

After removal of the organic solvent, the particles are separated from the emulsion in any desired manner as by filtration, centrifuging and the like. The particles are then washed and dried. One washing is generally sufficient to remove the emulsifying agent from the surface of the particles.

The cellulose nitrate particles prepared according to our process are spherical and may be obtained in sizes as small as 1 micron or less in diameter. The particle size generally ranges up to about 1 to 10 or 30 microns. This is the preferred size range. Depending upon the specific components and concentrations employed in the process, particle size may range up to about 100 microns. In general, products in which the average particle diameter is above about 50 microns are marginal. In other words, it is preferable that the size distribution of the particles by number be such that the maximum average size is about 50 microns. Since all of the particles in a given production batch are obtainable in the desired small size range, there is no necessity for fractional screening or reworking of excessively large particles.

Density of the cellulose nitrate spheres is high. Average density of cellulose nitrate spheres containing over 12% nitrogen is about 1.4 to 1.6. Minimum average density of the lower nitrogen content cellulose nitrate spheres is about 1.1 to 1.2.

The small, dense, spherical particles of cellulose nitrate may be employed in the manufacture of lacquers and plastics in any desired and conventional manner. They are especially useful, however, in that they can be suspended in plasticizers to form homogeneous, stable, fluid slurries which may be poured as coatings or films without requiring the addition of water or a volatile solvent and may be molded into objects of any desired shape and size without the application of high temperatures and pressures.

Nitroglycerin is readily incorporated with the cellulose nitrate particles by introducing it into the lacquer. It may be added with the organic solvent prior to solution of the cellulose nitrate or it can be added to the cellulose nitrate-solvent solution. Stabilizing agents such as diphenyl amine, lecithin, and the like can similarly be added.

fonate (Petromix #9) as the emulsifying agent under vigorous agitation in a homogenizer. Agitation was continued and the nitromethane was removed from the dispersed lacquer particles by distillation at 23–28° C. and a pressure of 6.5 cm. The resulting cellulose nitrate particles were 1–15 micron spheres having a density of 1.39.

EXAMPLE III 60 grams of cellulose nitrate (13.55% N) were dissolved in 600 ml. ethyl acetate. The lacquer was dispersed in 450 ml. water containing 9.6 grams of a petroleum sulfonate (Petromix #9) as the emulsifying agent under vigorous agitation in a homogenizer. Agitation was continued and the ethyl acetate was removed from the dispersed lacquer particles by distillation at 22–39° C. and a pressure of 6.5 cm. The resulting cellulose nitrate particles were 1–20 micron spheres having a density of 1.56.

Other examples illustrating our invention are summarized in Table I. The particles formed were spherical.

Table I

| Cellulose nitrate | | Solvent, ml. | Surface active agent, grams | Water, ml. | Size, μ |
|---|---|---|---|---|---|
| Percent N | g. | | | | |
| 12.6 | 15 | Ethyl acetate 200 | Petroleum sulfonate [1] 3.2 | 150 | 1–20 |
| 13.55 | 15 | do | do | 150 | av. 8 1–5 |
| 13.55 | 15 | do | Petroleum sulfonate [1] 1.6 | 150 | 1–5 |
| 13.55 | 15 | do | Turkey red oil 3.2 | 150 | 1–7 |
| 13.55 | 20 | do | do | 150 | 1–15 av. 8 |
| 13.55 | 20 | do | Alkali metal rosin salt [2] 3 | 150 | 1–10 |
| 12.6 | 15 | do | Alkyl benzene sodium sulfonate [3] 0.2 | 150 | 1–10 |
| 13.55 | 15 | do | do | 150 | 1–5 |
| 13.43 | 15 | do | Ammonium salt of perfluoro acid [4] 0.5 | 150 | 1–15 |
| 13.55 | 20 | Ethyl acetate 170; Ethanol 30 | Turkey red oil 3.2 | 150 | 1–30 av. 10 |
| 12.6 | 15 | do | do | 150 | 1–20 |
| 12.6 | 15 | do | Petroleum sulfonate [1] 3.2 | 150 | 1–15 |
| 13.43 | 15 | do | Petroleum sulfonate [1] 1.6 | 150 | 1–20 |
| 13.43 | 15 | do | Alkyl benzene sodium sulfonate [5] 0.2 | 150 | 1–30 |
| 12.6 | 15 | Nitromethane 200 | Petroleum sulfonate [1] 3.2 | 150 | 1–5 |
| 12.6 | 60 | Nitromethane 800 | Petroleum sulfonate [1] 12.8 | 600 | 1–25 |
| 12.6 | 15 | Nitromethane 200 | Petroleum sulfonate [1] 1.2 | 150 | 1–10 |
| 13.55 | 15 | do | Alkyl benzene sodium sulfonate [3] 0.2 | 150 | 2–15 |
| 10.5–11.5 | 30 | Methyl ethyl ketone 170; acetone 30 | Petroleum sulfonate [1] 0.4 | 150 | 1–20 |
| 10.5–11.5 | 30 | do | Petroleum sulfonate [1] 3.2 | 150 | 1–10 |
| 10.5–11.5 | 30 | do | do | 150 | 1–10 |
| 10.5–11.5 | 30 | do | Petroleum sulfonate [6] 3.2 | 150 | 1–5 |
| 10.5–11.5 | 30 | do | Petroleum sulfonate [7] 3.2 | 150 | 1–5 |
| 10.5–11.5 | 30 | do | Petroleum sulfonate [8] 3.2 | 150 | 1–5 |
| 10.5–11.5 | 30 | do | Petroleum sulfonate [1] 3.2, ammonium salt of perfluoro acid [4] 0.1. | 150 | 1–2 |
| 10.5–11.5 | 30 | do | Petroleum sulfonate [1] 3.2, alkyl benzene sodium sulfonate [5] 0.1. | 150 | 1–3 |
| 10.5–11.5 | 30 | do | Alkyl benzene sodium sulfonate [1] 3.2, alkyl benzene sodium sulfonate [5] 0.1. | 150 | 1–2 |
| 10.5–11.5 | 30 | Methyl ethyl ketone 100; Acetone 100 | Petroleum sulfonate [1] 3.2 | 150 | 1–10 |
| 10.5–11.5 | 30 | Methyl ethyl ketone 50; Acetone 150 | do | 150 | 1–50 |
| 13.43 | 15 | Methyl ethyl ketone 200 | do | 150 | 5–40 |
| 13.43 | 15 | Methyl ethyl ketone 85; Acetone 30; Ethyl acetate 85. | do | 150 | 2–45 av. 20 |

[1] Petromix #9.
[2] Dresinate 731.
[3] Ultrawet K.
[4] Minnesota Mining F-126.
[5] Ultrawet DS.
[6] Petronate XL.
[7] Petronate.
[8] Petromix #2.

EXAMPLE I 60 grams of cellulose nitrate (12.6% N) were dissolved in 800 ml. nitromethane. The lacquer was dispersed in 600 ml. water containing 12.8 grams of petroleum sulfonate (Petromix #9) as the emulsifying agent under vigorous agitation in a homogenizer. Agitation was continued for about 5 minutes and then the emulsion was flooded with 4 gallons of water with continued agitation to elute the organic solvent from the dispersed lacquer particles. The particles were filtered, given one washing with water and dried. The resulting cellulose nitrate particles were 1–15 micron spheres.

EXAMPLE II 45 grams of cellulose nitrate (12.6% N) were dissolved in 600 ml. of nitromethane. The lacquer was dispersed in 450 ml. water containing 9.6 grams of a petroleum sul- Although this invention has been described with reference to illustrative embodiments thereof, it will be apparent to those skilled in the art that it may be embodied in other forms but within the scope of the appended claims.

We claim:

1. A process for making small, dense, substantially spherical particles of cellulose nitrate, the particles being characterized by a maximum diameter of about 100 microns, which comprises dissolving up to about 20% of the cellulose nitrate in an organic solvent which is moderately soluble in water to the extent of about 5 to 80 parts in 100 parts of water at 20° C., any component of said solvent having a water solubility of at least about 5 parts, dispersing the cellulose nitrate solution in water in the presence of a polar, surface-active emulsifying agent which is preferentially soluble in the water and which does not increase substantially the viscosity of the water phase, the water being present in amount sufficient to form an oil-in-water emulsion and up to about 100% by weight of the organic solvent, removing the organic solvent from the dispersed cellulose nitrate particles by diluting with sufficient water to dissolve the organic solvent out of the dispersed cellulose nitrate particles, and separating the particles from the water.

2. The process of claim 1 in which the water solubility of the organic solvent is about 5 to 60 parts in 100 parts of water at 20° C., and the amount of water employed to form the emulsion is about 50 to 100% by volume based on the organic solvent.

3. The process of claim 2 in which the cellulose nitrate has a nitrogen content of more than 12% and the maximum concentration of the cellulose nitrate in the organic solvent is about 10%.

4. The process of claim 2 in which the cellulose nitrate has a nitrogen content of up to about 12% and the maximum concentration of the cellulose nitrate in the organic solvent is about 15%.

5. The process of claim 1 in which the organic solvent comprises at least 2 solvent components, one of said components being moderately soluble in water to the extent of at least about 5 parts per 100 parts of water at 20° C. and another of said components being infinitely soluble in water.

6. The process of claim 5 in which the cellulose nitrate has a nitrogen content of more than 12% and the maximum concentration of the cellulose nitrate in the organic solvent is about 10%.

7. The process of claim 5 in which the cellulose nitrate has a nitrogen content of up to about 12% and the maximum concentration of the cellulose nitrate in the organic solvent is about 15%.

8. The process of claim 6 in which the organic solvent is selected from the group consisting of methyl ethyl ketone plus acetone, ethyl acetate, ethyl acetate plus acetone, ethyl acetate plus ethanol, and nitromethane, the maximum water-solubility of said solvent being about 60 parts per 100 parts of water at 20° C.

9. The process of claim 7 in which the organic solvent is selected from the group consisting of methyl ethyl ketone plus acetone, ethyl acetate, ethyl acetate plus acetone, ethyl acetate plus ethanol, and nitromethane, the maximum water-solubility of said solvent being about 60 parts per 100 parts of water at 20° C.

10. The process of claim 8 in which the emulsifying agent is a sulfonated oil.

11. The process of claim 9 in which the emulsifying agent is a sulfonated oil.

12. A process of making small, dense, substantially spherical particles of cellulose nitrate having a maximum diameter of up to about 100 microns, which comprises dissolving up to about 20% of the cellulose nitrate in an organic solvent which is moderately soluble in water to the extent of about 5 to 80 parts in 100 parts of water at 20° C., dispersing the cellulose nitrate solution in water in the presence of a polar, surface-active emulsifying agent which is preferentially soluble in the water and which does not substantially increase the viscosity of the water phase, to form an emulsion, removing the organic solvent from the dispersed cellulose nitrate particles, the temperature of the emulsion during substantial solvent removal being up to the boiling point of the solvent at the given pressure but not above about 65° C., and separating the particles from the water.

13. A process for making small, dense, substantially spherical particles of cellulose nitrate having a maximum diameter of up to about 100 microns, which comprises dissolving up to about 15% of the cellulose nitrate in an organic solvent which is moderately soluble in water to the extent of about 5 to 60 parts in 100 parts of water at 20° C., dispersing the cellulose nitrate solution in water in the presence of a polar, surface-active emulsifying agent which is preferentially soluble in the water and which does not substantially increase the viscosity of the water phase, to form an emulsion, removing the organic solvent from the dispersed cellulose nitrate particles, the temperature of the emulsion during substantial solvent removal being up to the boiling point of the solvent at the given pressure but not above about 50° C., and separating the particles from the water.

14. The process of claim 13 in which the cellulose nitrate has a nitrogen content of more than 12% and the maximum concentration of the cellulose nitrate in the organic solvent is about 10%.

15. A process for making small, dense, substantially spherical particles of cellulose nitrate, the particles being characterized by a maximum diameter of about 100 microns, which comprises dissolving up to about 20% of the cellulose nitrate in an organic solvent which is moderately soluble in water to the extent of about 5 to 80 parts in 100 parts of water at 20° C., any component of said solvent having a water solubility of at least about 5 parts, dispersing the cellulose nitrate solution in water in the presence of a polar, surface-active emulsifying agent which is preferentially soluble in the water and which does not increase substantially the viscosity of the water phase, to form an emulsion, removing the organic solvent from the dispersed cellulose nitrate particles by diluting with sufficient water to dissolve the organic solvent out of the dispersed cellulose nitrate particles, and separating the particles from the water.

16. A process for making small, dense substantially spherical particles of cellulose nitrate, the particles being characterized by a maximum diameter of about 100 microns, which comprises dissolving up to about 15% of the cellulose nitrate in an organic solvent which is moderately soluble in water to the extent of about 5 to 60 parts in 100 parts of water at 20° C., any component of said solvent having a water solubility of at least about 5 parts, dispersing the cellulose nitrate solution in water in the presence of a polar, surface-active emulsifying agent which is preferentially soluble in the water and which does not increase substantially the viscosity of the water phase, to form an emulsion, removing the organic solvent from the dispersed cellulose nitrate particles by diluting with sufficient water to dissolve the organic solvent out of the dispersed cellulose nitrate particles, and separating the particles from the water.

17. The process of claim 16 in which the cellulose nitrate has a nitrogen content of more than 12% and the maximum concentration of the cellulose nitrate is about 10%.

References Cited in the file of this patent

UNITED STATES PATENTS

| Number | Name | Date |
|---|---|---|
| 2,027,114 | Olsen et al. | Jan. 7, 1936 |
| 2,160,626 | Schaefer | May 30, 1939 |
| 2,375,175 | Silk | May 1, 1945 |
| 2,715,574 | Cox | Aug. 16, 1955 |
| 2,722,528 | Johnson | Nov. 1, 1955 |
| 2,843,582 | Voris | July 15, 1958 |